United States Patent [19]
Gerlach

[11] 3,717,825
[45] Feb. 20, 1973

[54] LIQUID LASER

[75] Inventor: Helmut Gerlach, Aalen, Germany

[73] Assignee: Carl Zeiss-Stiftung, Wuerttemburg, Germany

[22] Filed: March 3, 1972

[21] Appl. No.: 231,547

[30] Foreign Application Priority Data

March 19, 1971 Germany.....................P 21 13 464.5

[52] U.S. Cl................................................331/94.5
[51] Int. Cl................................................H01s 3/20
[58] Field of Search......................................331/94.5

[56] References Cited

UNITED STATES PATENTS

| 3,654,568 | 4/1972 | Schimitschek | 331/94.5 |
| 3,541,469 | 11/1970 | Schimitschek et al. | 331/94.5 |
| 3,521,190 | 7/1970 | Schimitschek et al. | 331/94.5 |

*Primary Examiner*—William L. Sikes
*Attorney*—Hans W. Hefter

[57] ABSTRACT

A liquid laser, particularly a dyestuff laser, is provided with a liquid guiding chamber through which circulates a cooled laser liquid and which is provided with a U-shaped laser active zone formed by a light transmitting longitudinal cap into which extends a tongue forming in said cap a U-shaped zone of uniform cross section. This U-shaped laser active zone is disposed in a focal line of an elliptically shaped pump light reflector while a source of pump light is disposed in the other focal line.

8 Claims, 5 Drawing Figures

3,717,825

LIQUID LASER

The invention relates to liquid lasers, particularly dyestuff lasers, comprising a chamber for guiding the liquid, a circulation system, a cooling system for the laser active liquid, a pump light source and a resonator system.

In liquid lasers a construction is desirable which assures a quick exchange of the liquid in the laser active zone, a good possibility of cooling the laser liquid, and an easy and quick change of the entire dyestuff solution. In addition, the laser active liquid has to be easily adjustable in its chamber with respect to the source of pump light.

Liquid lasers are known in principal. Of increased interest are at the present time so-called dyestuff lasers whose laser active substances consist of a dissolved organic dyestuff which in a solution fluorizes with high quantity yield, and when illuminated with intensive light may be pumped in active condition into one or more optical permissive transitions and for a stimulated emission may be brought to a frequently wide wave length range. Since during the heating of the laser liquid by a pump light, a formation of streaks is possible and also a photo-chemical destruction of the dyestuff molecules by the pump light might take place, the known devices employ for the laser liquid a supply vessel and a circulation system which has the purpose to effect a steady exchange of the laser liquid in the laser active zone. Since the practical employment of a liquid laser depends not only from its efficiency, that is, the ratio of electrical pump energy to the laser output energy, but also depends from the time period which elapses between two successive laser impulses, the construction of the liquid chamber and the circulation system determine substantially the quality of the laser. One has to take care that during a repeated pulse operation the dyestuff solution in the active zone between two pulses has to be completely exchanged in order to remove streaks and destroyed molecules which decrease the intensity of the emitted laser light. In addition, it is desirable to operate with a high dyestuff concentration because the term of life of the entire solution is proportional to the dyestuff concentration. A high dyestuff concentration on the other hand means that the cross section in the active zone has to be kept small in order to obtain a stimulation of the emission through the entire layer thickness. At the same time, however, the flow resistance in the chamber must be small so that one may operate with the smallest possible pump pressures for the circulation system. From the multiplicity of the above described relations it is clear that until now no satisfactory solution for a dyestuff laser has been found which assures a continuous operation of the same. In the known devices either the laser capacity is unsatisfactory or the pulse frequency is reduced owing to a too small exchange speed of the dyestuff solution, or when the flow is too fast it causes turbulence appearances and cavitation blisters in the active zone. Furthermore, the safety in operation in the heretofore employed liquid lasers is often reduced in that during an exchange of the chamber the resonator mirrors come out of adjustment.

The object of the invention is a dyestuff laser having a high efficiency and which is distinguished by a simple construction and an easy exchangeability of the parts.

The dyestuff laser of the invention permits also a high dyestuff concentration and the circulation system for the laser liquid is so designed that the pulse succession of 50 and 100 Hz, respectively, may be obtained for a longer period of time. This object of the invention is attained in that the liquid guiding chamber is provided with feed and discharge connections which are arranged directly adjacent each other and face in the same direction and that a U-shaped connection range of the same cross-section is provided, which U-shaped connection range forms the laser active zone. This laser active zone is arranged in a focal line of an elliptical-shaped pump light reflector while the source of the pump light is arranged in the other focal line.

In this device of the invention the laser active zone is disposed at the place of the highest density of the light energy, whereby the image of the source of pump light is projected into the active zone.

For the liquid guiding chamber a mirror symmetrical construction is of advantage. In an advantageous embodiment of the invention the laser active zone of the liquid guiding chamber is surrounded by a light permeable longitudinal cap having a small diameter whereby this cap is rigidly connected with the metallic part of the chamber.

For the prevention of undesirable reflections of the laser light on the cap it is advisable to provide the inner face of the cap with a satin finish.

For the purpose of obtaining a good heat dispersion within the range of the laser active zone it is of advantage to make the cap of sapphire.

For the separation of the feed and discharge of the laser liquid it is of advantage when a tongue extends into the cap which is rigidly connected with the metallic part of the chamber and whose distance from the curved inner face of the cap determines the thickness of the layer of the laser active zone.

It is of advantage when the rounded end of the tongue is burnished in order to reflect the pump light in the active zone.

Furthermore, both of the narrow end faces of the cap are covered by light permeable members or laser mirrors which may be arranged plane parallel or in the form of a Brewster angle.

The advantages which are obtained with the liquid laser of the invention consist particularly in this, that owing to the geometric arrangement of the individual parts a high degree of efficiency is obtained. In view of the current deflection of the laser active liquid about an angle of 180° in the range of the active zone it is sufficient to employ a relatively small pump for the liquid and to assure that the laser liquid remains in the active zone a sufficiently short period of time to maintain a pulse frequency of 50 to 100 Hz for a longer period of time. Another advantage of the laser of the invention is that the formation of streaks is substantially reduced owing to the excellent heat conductivity of the chamber. The narrow cross-section of the laser active zone permits a high dyestuff concentration which is effective over the entire cross-section. Still another and important advantage of the laser of the invention resides in this, that the chamber may be exchanged conveniently and with safety without the level of the laser resonator coming out of adjustment.

A laser in accordance with the invention will now be described in greater detail with reference to the embodiment which is illustrated in the accompanying drawings.

IN THE DRAWINGS

Figure 1:
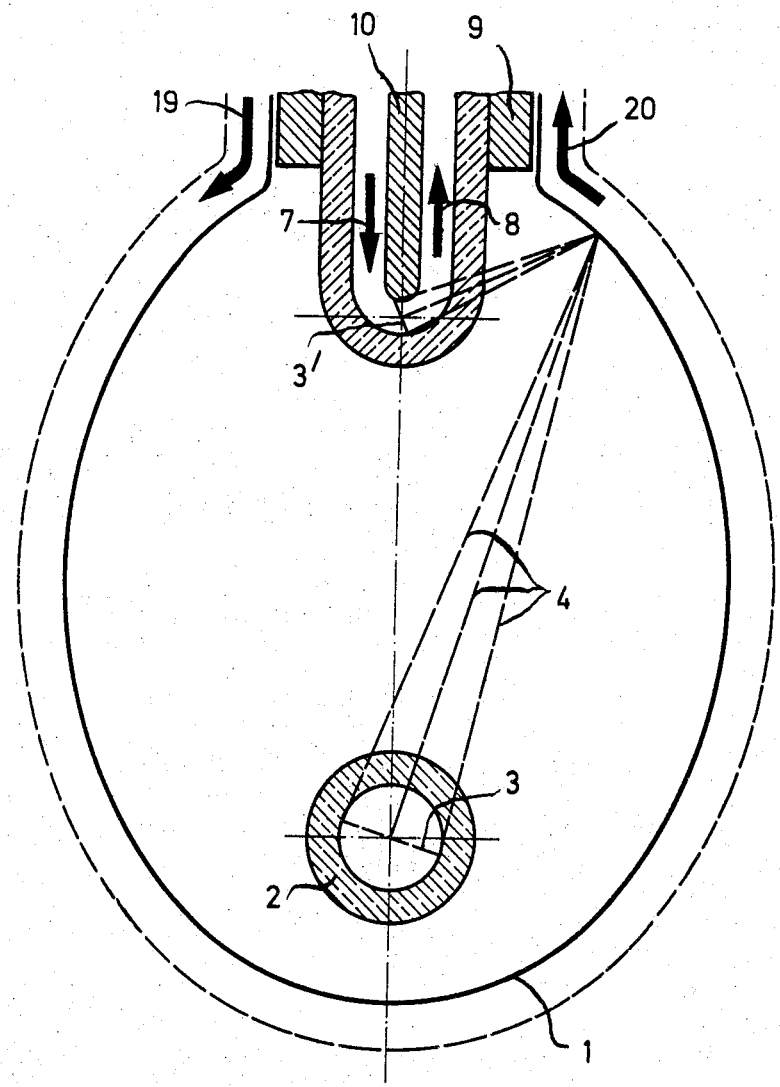
FIG. 1 illustrates a geometric arrangement of the individual parts of a liquid laser in accordance with the invention.

Referring to FIG. 1, the liquid laser is provided with a cylinder elliptical pump light reflector 1 which acts as a resonator system. For the purpose of cooling, the reflector 1 is filled with water which by a circulating system 19, 20, is maintained at a constant temperature. For increasing the capacity of the laser, ultraviolet absorbing substances as for instant $CuSO_4$ may be added to the water. The numeral 2 designates a flash bulb which is used as a source of pump light and has an inner diameter 3 of 3 mm. A cone of rays 4 projects a reduced image 3' of the inner diameter 3 into the range of the laser active zone. The liquid guiding chamber is provided with a transparent cap 5. The laser liquid flows in the direction of the arrow 7 into the active zone, is deflected at the level of the second focal line of the ellipse about an angle of 180°, and leaves the laser active zone again in the direction of the arrow 8. The cap 5 is connected with the metallic part 9 of the chamber. A tongue 10 which is rigidly connected with the metallic part of the chamber extends into the cap 5 and serves for the separation of the feed and the discharge of the laser liquid into the cap 5.

Figure 2:
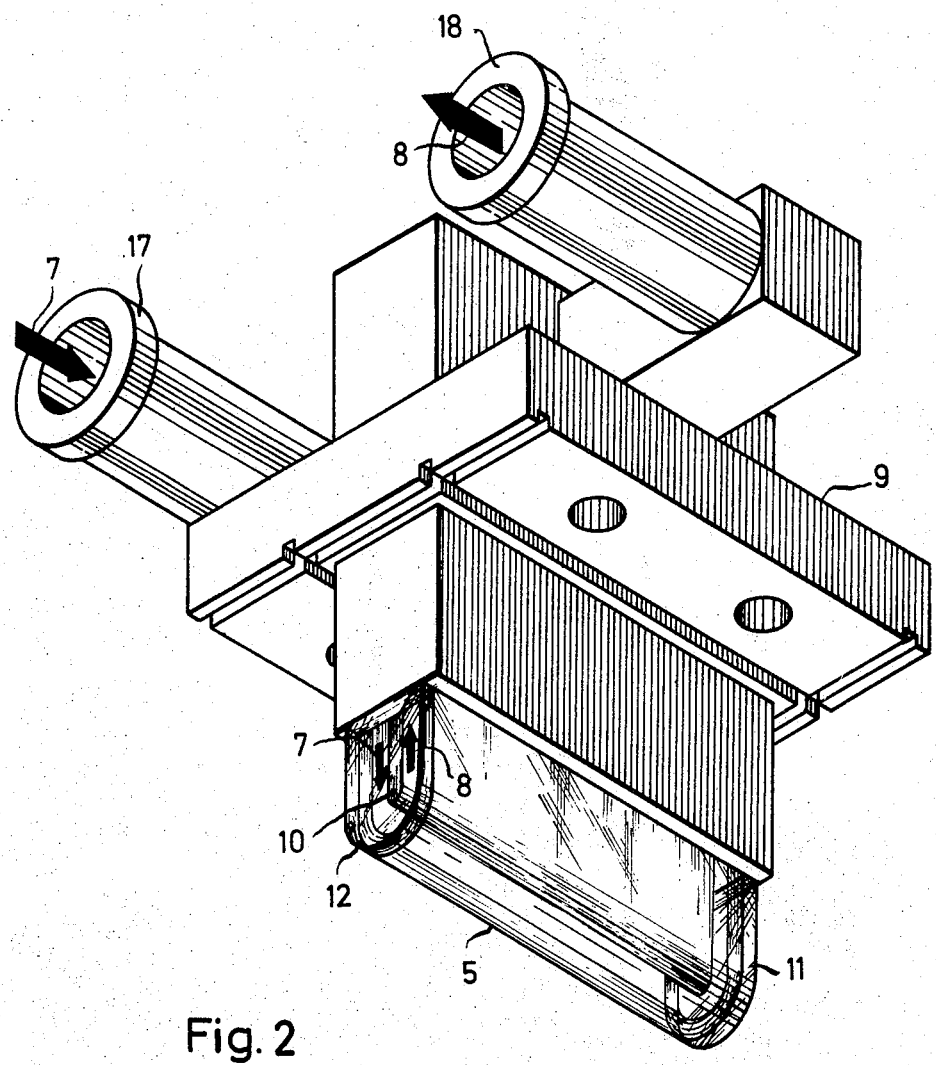
FIG. 2 illustrates a perspective view of the chamber which guides the laser liquid.
Figure 5:
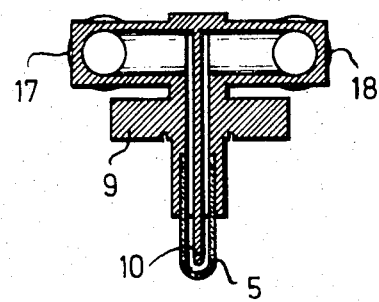
FIG. 5 is a vertical sectional view of the liquid guiding chamber along the line V—V of FIG. 4.
Figure 4:
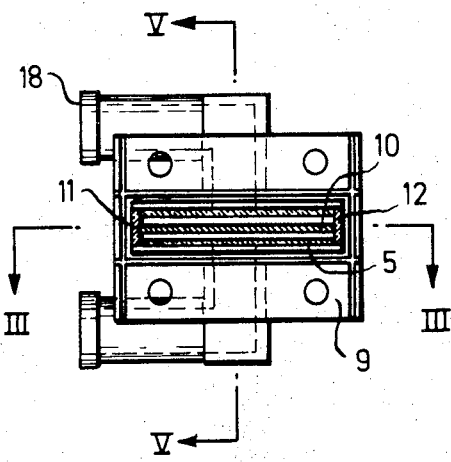
FIG 4 is a horizontal sectional view of the liquid guiding chamber along the line IV—IV of FIG. 3.
Figure 3:
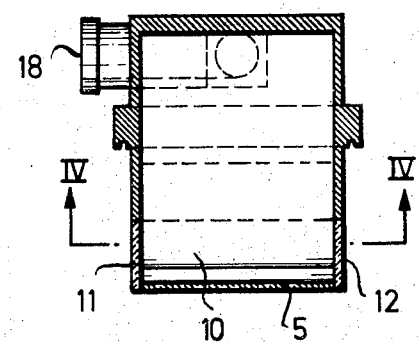
FIG. 3 is a vertical sectional view of the liquid guiding chamber, substantially along the line III—III of FIG. 4.

In FIG. 2 the feed and discharge connection of the metallic part of the chamber are designated by 17 and 18, respectively. The transparent cap 5 is closed at its small ends by light transmitting elements 11 and 12 or by laser mirrors. The distance of the tongue 11 from a curved inner surface of the cap 5 comprises in the illustrated embodiment of the invention approximately 1 mm, so that the cross section of the laser active zone is limited by the end of the tongue 10, the inner surface of the cap 5 and the longitudinal sides of the cap 5.

What I claim is:

1. A liquid laser, particularly a dyestuff laser, comprising a liquid guiding chamber, a circulating means for a laser active liquid, cooling means for said laser active liquid, a pump light and a resonator system, said liquid guiding chamber including a feed connection and a discharge connection arranged directly adjacent each other and facing the same direction and a U-shaped connection range of the same cross section, and said connection range forming a laser active zone which is disposed in a focal line of an elliptically shaped pump light reflector acting as said resonator system, while a source of pump light is disposed in the other focal line.

2. Liquid laser according to claim 1, in which said liquid guiding chamber is mirror symmetrical.

3. Liquid laser according to claim 1, including a light transmitting longitudinal cap with a curvature of small diameter surrounding said laser active zone of said liquid guiding chamber, and means connecting said cap with a metallic part of said chamber.

4. Liquid laser according to claim 1, in which the inner surface of said cap is satin finished.

5. Liquid laser according to claim 1, in which said cap is made of sapphire.

6. Liquid laser according to claim 1, including a light transmitting cap surrounding said laser active zone, a tongue extending into said cap, said cap having a curved inner face, said tongue being connected with a metallic part of said chamber and separating said feed and discharge connections of said liquid in said laser active zone, the distance of said curved inner face of said cap from said tongue determining the thickness of the layer of said active zone.

7. Liquid laser according to claim 6, in which the end of said tongue extending into said laser active zone is mirror burnished.

8. Liquid laser according to claim 1, including a light transmitting longitudinal cap surrounding said laser active zone, said cap having two narrow end faces, and light transmitting members covering said end faces of said cap.

* * * * *